United States Patent [19]
Wittmann

[11] Patent Number: 5,961,073
[45] Date of Patent: Oct. 5, 1999

[54] REDUCED HEAD PAD SEAT

[75] Inventor: Thomas E. Wittmann, Seattle, Wash.

[73] Assignee: The Boeing Company, Seattle, Wash.

[21] Appl. No.: 08/371,511

[22] Filed: Jan. 11, 1995

[51] Int. Cl.$^6$ .................................................. B64D 11/06
[52] U.S. Cl. .................................. 244/122 R; 244/122 B
[58] Field of Search ..................... 244/122 R, 122 AG, 244/122 B; 297/216.15, 216.1, 468

[56] References Cited

U.S. PATENT DOCUMENTS

| | | | |
|---|---|---|---|
| 2,725,921 | 12/1955 | Markin | 297/216.15 |
| 2,922,461 | 1/1960 | Braun | 297/216.15 |
| 3,832,002 | 8/1974 | Eggert et al. . | |
| 4,301,983 | 11/1981 | Horan | 297/216.1 |
| 5,022,707 | 6/1991 | Beauvais et al. . | |
| 5,076,608 | 12/1991 | Shimose | 297/468 |
| 5,125,598 | 6/1992 | Fox . | |
| 5,244,252 | 9/1993 | Serber . | |
| 5,320,308 | 6/1994 | Bilezikjian et al. . | |

FOREIGN PATENT DOCUMENTS

| | | |
|---|---|---|
| 537159 | 3/1959 | Belgium . |
| 0 323 758 | 7/1989 | European Pat. Off. . |
| 2 419 079 | 10/1979 | France . |
| 1163168 | 2/1964 | Germany . |
| 2 179 245 | 3/1987 | United Kingdom . |

*Primary Examiner*—Galen L. Barefoot
*Attorney, Agent, or Firm*—Mary Y. Redman

[57] ABSTRACT

A seat assembly for commercial aircraft or other vehicles has features that reduce head excursion in high impact events such as crashes or collisions. These include the use of low-elongation seatbelt material and high seatbelt anchor location. Another feature which reduces head excursion is an articulating seatpan. The bottom seat cushion is guided by rollers in tracks to follow a prescribed motion under forward inertial load. As the inertial load is applied, the seatpan travels forward and tilts upward. This reduces forward pelvic rotation which, in turn, reduces head excursion. Other features which limit pelvic rotation are the use of dynamically stiff foam for the seat cushion, and a relatively steep initial cushion angle/cushion contour.

10 Claims, 5 Drawing Sheets

REDUCED HEAD PAD SEAT

BACKGROUND OF THE INVENTION

The present invention relates to seat assemblies and restraint systems for passengers in moving vehicles such as commercial airplanes.

Reduction of head injuries to commercial aircraft passengers in the event of an emergency is of great concern for obvious safety reasons, and also is the goal of certain Government regulations. In commercial aircraft, the seats immediately behind the bulkhead are of special concern because of the possibility of a passenger's head striring the bulkhead in a high impact event such as a crash or emergency landing. While the chance of head injury for occupants of these seats could be reduced by increasing the distance between the seat and bulkhead, this would also significantly reduce floor space available for seating and therefore have a significant adverse impact on revenue in commercial aircraft.

What is needed is a seating and restraint system which reliably reduces head excursion (i.e., the forward distance traversed by an occupant's head during a high impact event) so as to prevent or minimize the chance for head impact on the bulkhead. This would have the same beneficial effect in reducing head injuries as would increasing the distance between the seat and bulkhead, without the loss of seating space. Such a reduced head path seat should ideally have little impact on aircraft interiors, cause no reduction in seating density, and preferably involve passive technology needing no triggering devices. The features which contribute to reduction of head excursion should be imperceptible to the passenger during normal operation, so as not to affect his or her comfort.

SUMMARY OF THE INVENTION

The present invention is a seat assembly for commercial aircraft or other vehicles with features that reduce head excursion in high impact events such as crashes or collisions. In a preferred embodiment, it has a commercially practical and inexpensive design, and is simple, rugged, and reliable in operation.

Several features of a preferred embodiment each contribute to the reduction in head excursion. These include the use of low-elongation seatbelt material and high seatbelt anchor location. Another feature which reduces head excursion is an articulating seatpan. The bottom seat cushion is guided by rollers on tracks to follow a prescribed motion under forward inertial load. As the inertial load is applied, the seatpan travels forward and tilts upward. This reduces forward pelvic rotation which, in turn, reduces head excursion.

Other features which limit pelvic rotation are the use of dynamically stiff foam for the seat cushion, and a relatively steep initial cushion angle/cushion contour. These features can be used in various combinations to reduce head excursion.

These and other features of a preferred embodiment are described in detail below, with reference to the Figures.

DETAILED DESCRIPTION OF THE PREFERRED EMBODIMENTS

Figure 1:
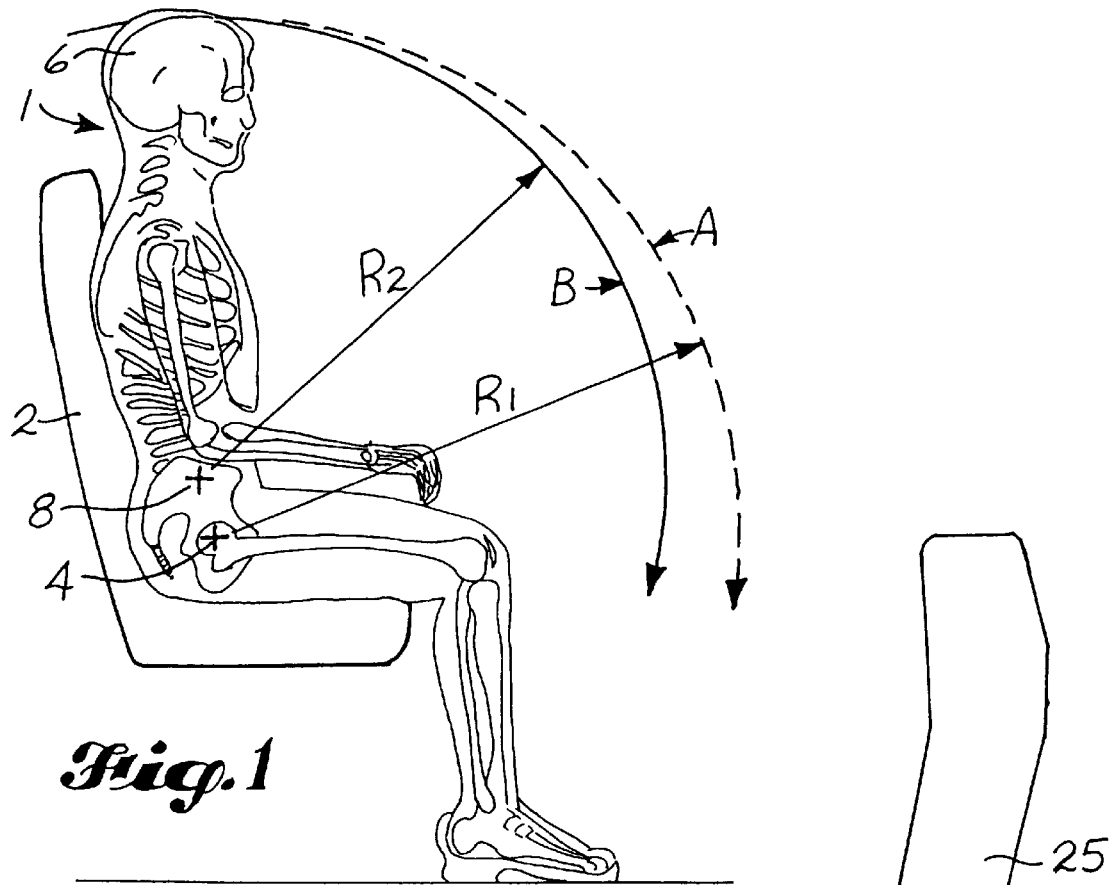
FIG. 1 is a side view of a passenger in a vehicle seat with arrows to indicate the path of travel of the head.
Figure 2:
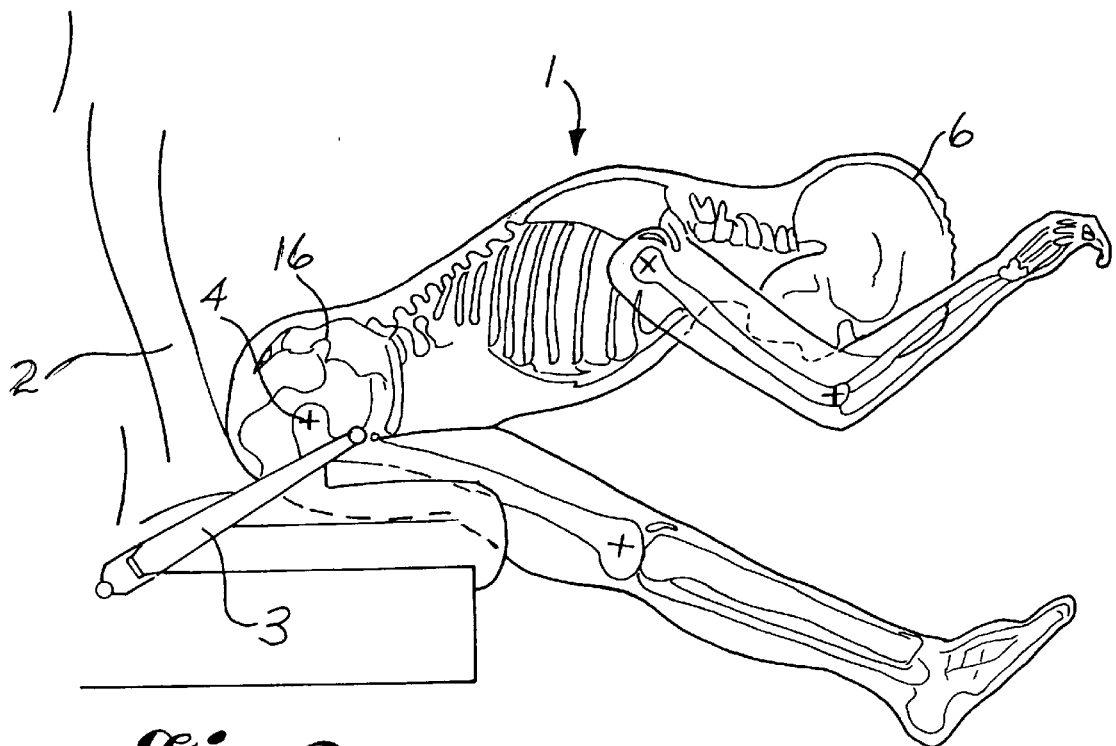
FIG. 2 is a side view of a passenger in a prior art vehicle seat in a vehicle which is undergoing a frontal impact.
Figure 3:
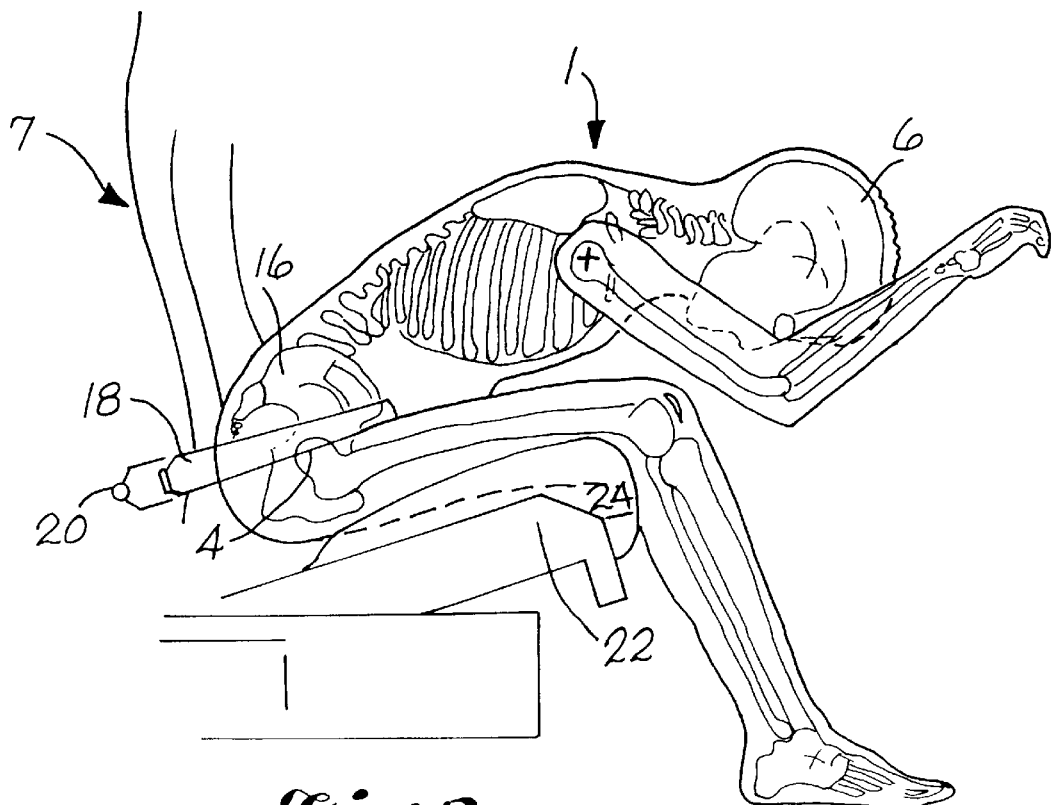
FIG. 3 is a side view of a passenger in a vehicle seat according to a preferred embodiment of the invention in a vehicle which is undergoing a frontal impact.

Resisting forward rotation of the pelvis is key to reducing head excursion. When a seated person leans forward, the pelvis tends to rotate with the upper body. Pelvic rotation in this direction is hereinafter referred to as forward pelvic rotation. As shown in FIGS. 1 and 2, the upper body of a seated person 1 subjected to an inertial load like that experienced in a high impact event in a conventional aircraft seat 2 with a conventional lap belt 3 rotates primarily about the upper femur/pelvic joint 4, with a great deal of forward pelvic rotation. The path of travel of the top of the head 6 is shown in FIG. 1 by arrow A, which describes a circle of radius $R_1$. Referring to FIGS. 1 and 3, if the pelvis 16 is restrained from rotating forward, the upper body rotates forward primarily by spinal flexure, rotating about a point 8 (shown in FIG. 1) in the lower abdomen. The head excursion path in this case is shown in FIG. 1 by arrow B which describes a circle of radius $R_2$. Head excursion is reduced because the distance from this point 8 in the lower abdomen to the top of the head 6 is less than the distance from the femur/pelvic joint 4 to the top of the head 6, so the radius $R_2$ of the resulting head path B is consequently shorter than radius $R_1$ of head path A. FIG. 2 shows the overall operation of a conventional, prior art seat 2, while FIG. 3 shows the operation of a reduced head path seat 7 according to a preferred embodiment of the present invention. Several features of the preferred embodiment work to resist forward pelvic rotation, and thereby reduce head excursion.

Figures 4A, 4B:
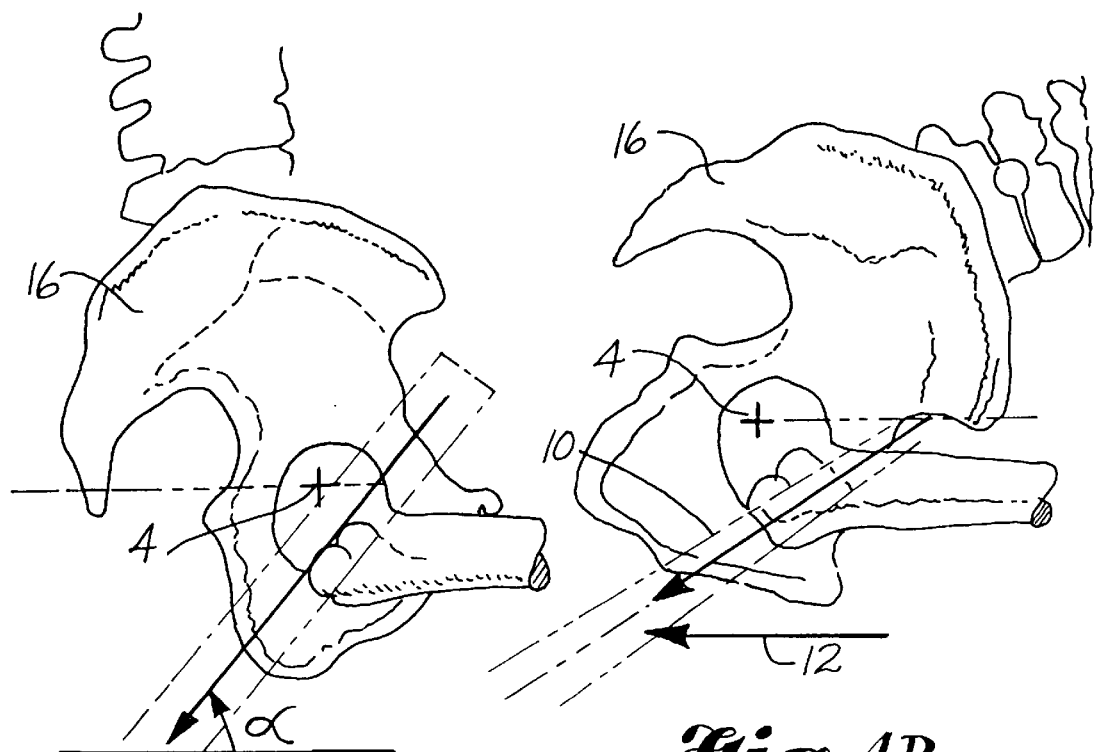
FIGS. 4a and 4b schematically show the action of seat belt restraining forces and impact forces on the pelvis of an occupant of a prior art seat.

A first feature which limits pelvic rotation is a high seatbelt anchor location. FIGS. 4a, 4b, 5a, and 5b show the effect of seatbelt mounting location. FIG. 4a shows conventional prior art placement of the seatbelt relative to the pelvis 16 before impact. The angle α between the seatbelt and the horizontal when the seatbelt is secured around the seat occupant in conventional seats is usually recommended to be about 45° to 55°, although in practice, angles of around 70° are not uncommon.

Figures 5A, 5B:
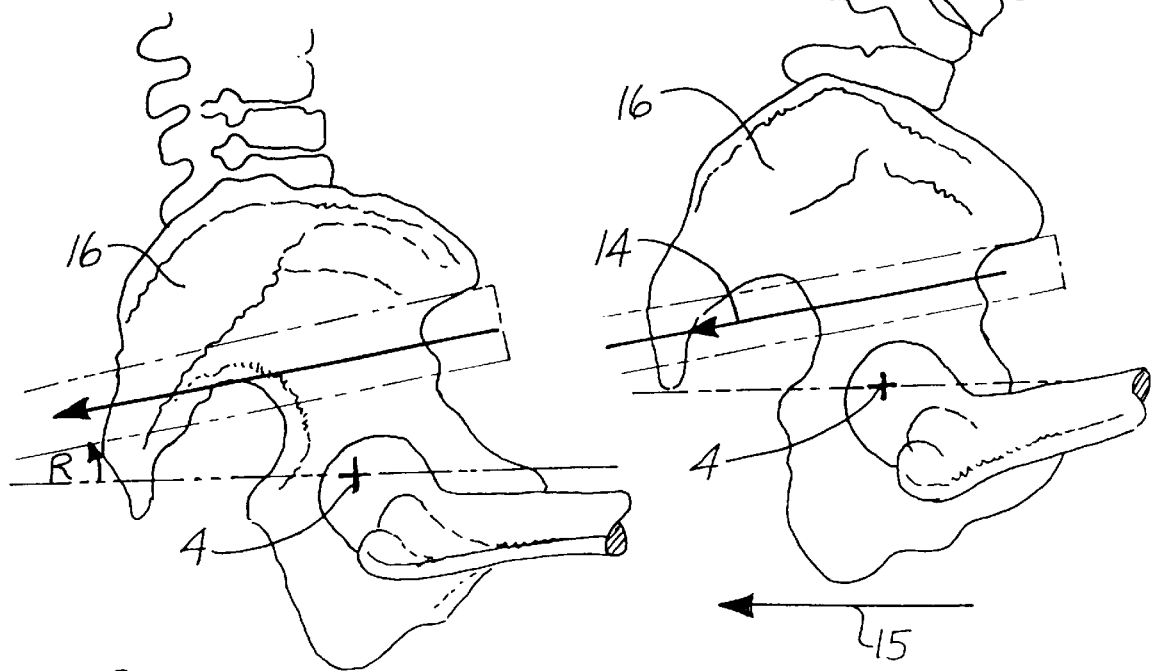
FIGS. 5a and 5b schematically show the action of seat belt restraining forces and impact forces on the pelvis of an occupant of a seat according to a preferred embodiment of the invention.

FIG. 5a shows the angle of seatbelt placement in the preferred embodiment. This angle β is preferably in the range of 10° to 20°, with an angle of 15° being preferable. FIG. 3 illustrates a seatbelt 18 mounted in this high anchor position. The mounting point is above the plane where the seatpan and seat back meet, and preferably is on that part of the seat frame which supports the seat back.

A comparison of FIGS. 2 and 3 will show how this positioning of the seatbelt anchor 20 at a higher point, so that the belt forms a shallower angle with the horizontal, restrains forward rotation of the pelvis. As shown in FIGS. 4b and 5b, in an impact situation, the direction of action of the conventionally mounted seatbelt, indicated by arrow 10, has only a small component opposing the direction of force of impact, indicated by arrow 12, as compared to the direction of action of the high-mounted seatbelt of the preferred embodiment, indicated by arrow 14. The high mounted seatbelt applies a strong rearward moment on the pelvis 16, as indicated by arrow 15. The seatbelt line of action 14 is more directly opposite the inertial load imposed on the occupant. Also, the seatbelt forces are applied higher on the pelvis 16 and the seatbelt anchor position is preferably chosen so as to have the belt maximally apply a moment resisting forward pelvic rotation.

The seatbelt material is preferably a material characterized by low elongation when loaded, such as polyester, rather than nylon as has been customary on commercial aircraft. When nylon webbing is loaded to 2500 pounds, the elongation is typically 15%–20%. Polyester webbing is stiffer, elongating about half as much when equally loaded. With less stretch, the occupant does not slip as far forward in the seat, and head excursion is thereby further reduced.

Figure 6:
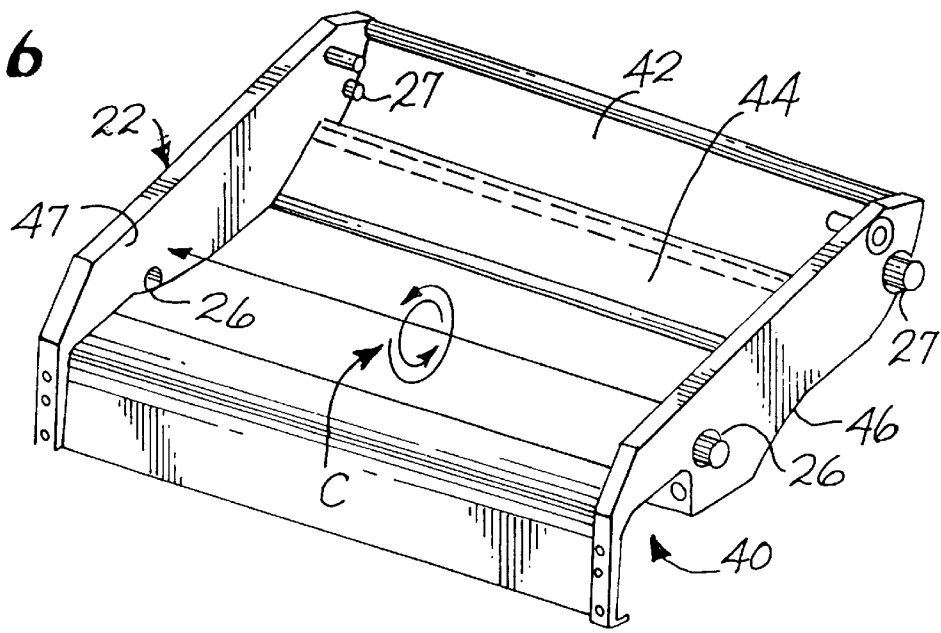
FIG. 6 illustrates the seatpan structure of a preferred embodiment of the invention.
Figure 7:
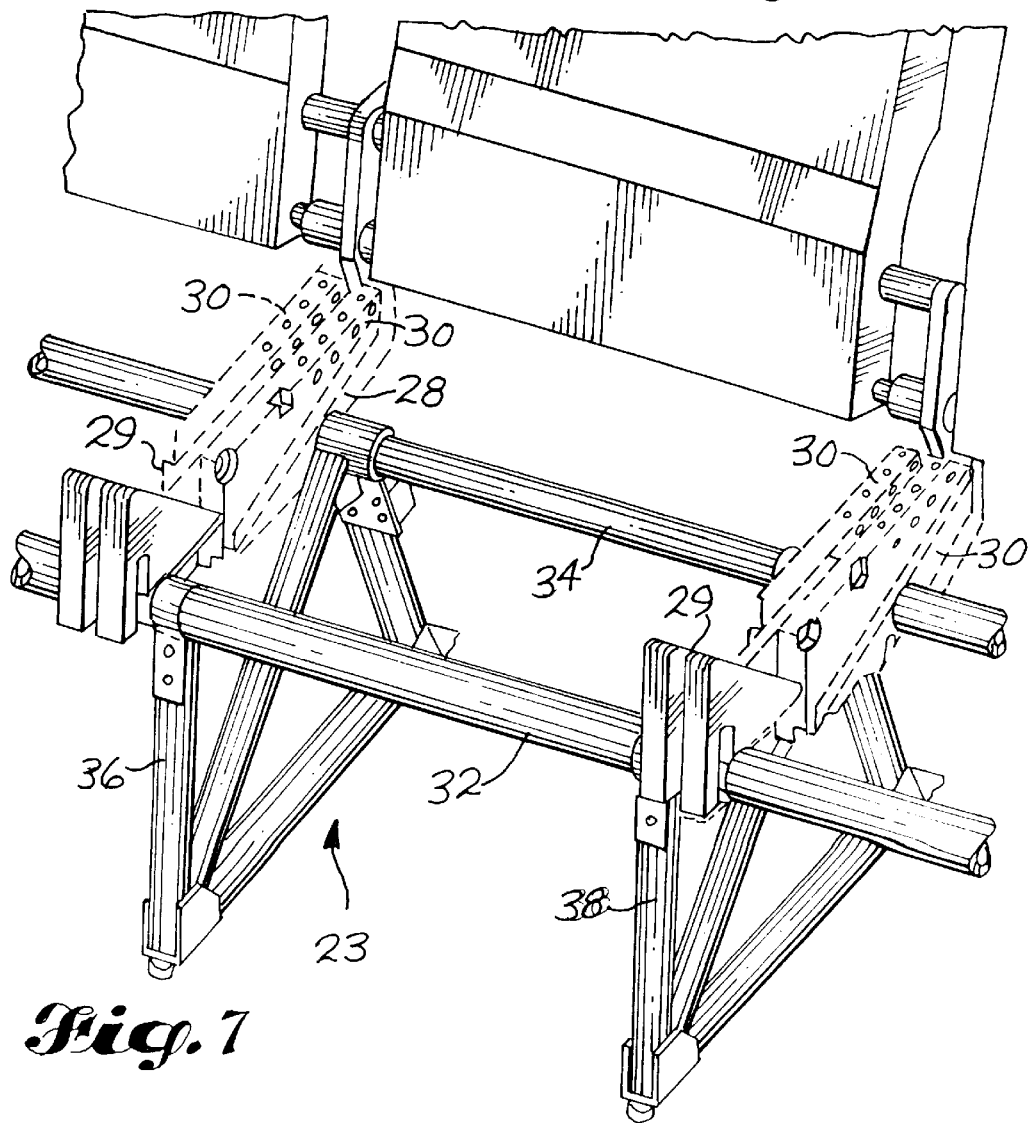
FIG. 7 illustrates the frame and seatpan mounting structure of a preferred embodiment of the invention.
Figure 8:
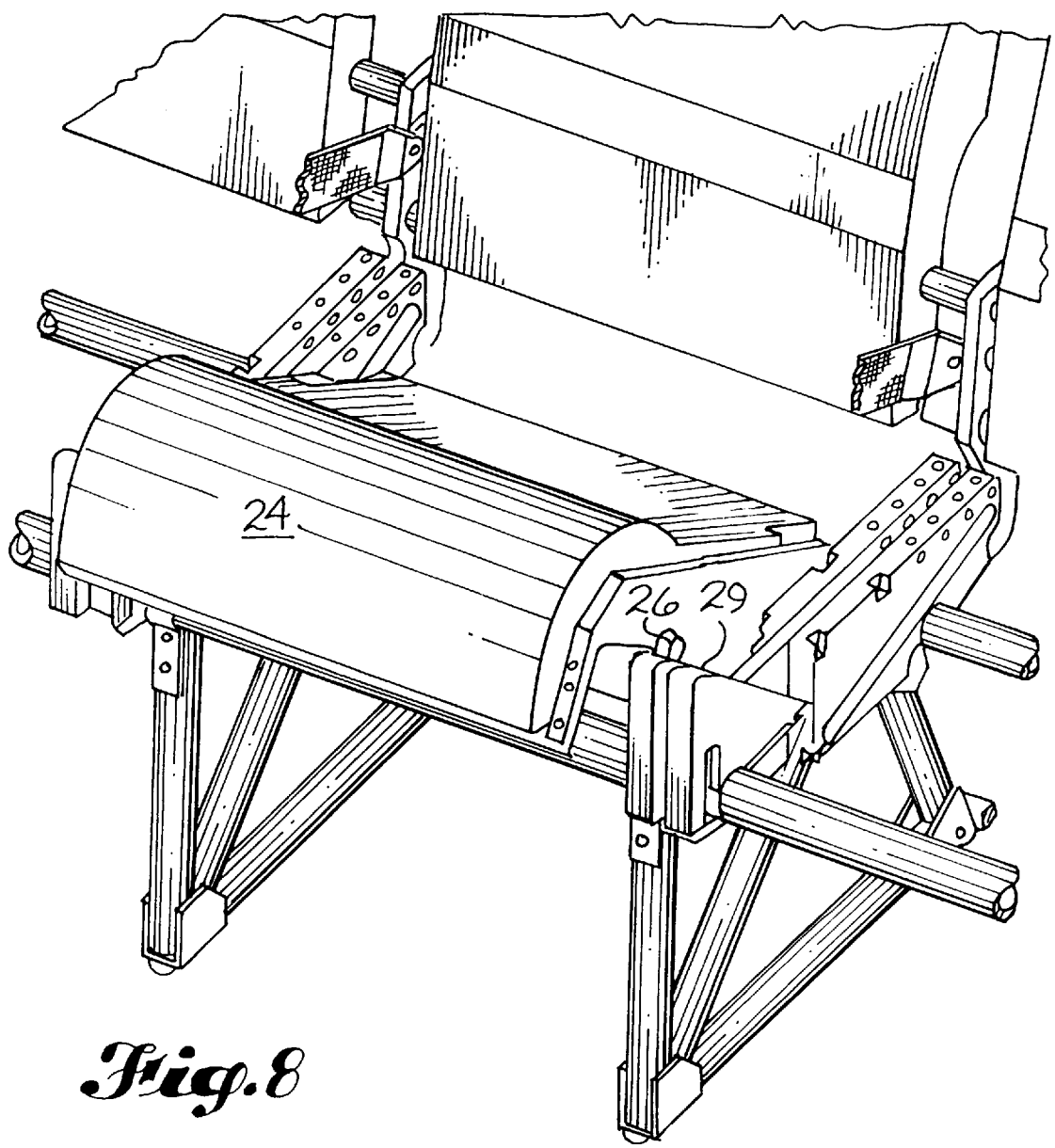
FIG. 8 illustrates the seatpan of FIG. 6 mounted on the frame of FIG. 7.

Another feature which reduces pelvic rotation is an articulating seatpan. As shown in FIG. 3, the front of the seatpan 22 of a preferred embodiment pivots upward while the seatpan moves slightly forward in an impact event. Referring to FIGS. 6, 7 and 8, the seatpan 22, which holds the bottom seat cushion 24, is guided by rollers 26, 27 in tracks 28 on the rear of the seat frame 23 and up ramps 29 on the front of the seat frame 23 to follow a prescribed motion under forward inertial load. As the inertial load is applied, the seatpan 22 travels forward and tilts upward. The forward travel resists forward pelvic rotation by reducing or reversing the direction of the frictional force the seatpan applies to the thighs and buttocks, while the upwards tilt of the seatpan 22 imparts a rearward rotation to the upper legs to further resist forward pelvic rotation. The upward tilting of the seatpan 22 also keeps the lower body planted in the cushion 24, directly opposing the forward motion of the occupant 1.

The trajectory of the seatpan 22 will be determined by the length and angles of the tracks 28 and ramps 29. In choosing these dimensions, those skilled in the art will appreciate that a steep trajectory rotates more for a given forward seatpan displacement than a shallow trajectory. The trajectory is chosen so as not to be too steep (in which case the seatpan will not rotate at all), and not too shallow (in which case the seatpan will move too far forward toward the bulkhead or other obstacle to be avoided).

Figure 9:
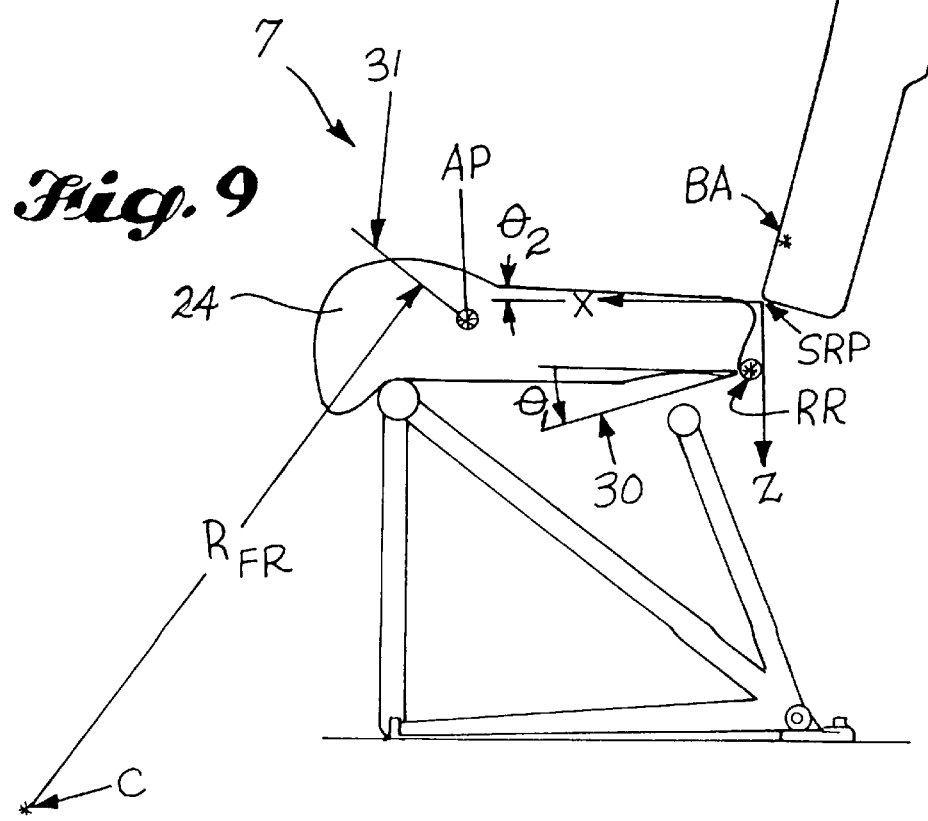
FIG. 9 is a side view of a seat with an X–Z coordinate system superimposed thereon to show the location of various points on a seat assembly according to a preferred embodiment.

FIG. 9 shows a schematic side view of a seat 7 according to a preferred embodiment with an X–Z coordinate system having its origin at the Seat Reference Point (SRP), the point where the bottom seat cushion and seat back meet. X coordinates are positive in a forward position (toward the left as illustrated); Z coordinates are positive in a downward direction. In the illustrated embodiment, the rear ramp is at an angle $\theta_1$ of 15 degrees to the horizontal, and the trajectory of the rear roller is indicated by line 30. The total forward motion of the seat is 3.35 inches, and the initial seat cushion angle $\theta_2$ is 2.7 degrees. In this illustrated embodiment, the surface of the front ramp is a circular arc 31 of radius 27.136 inches beginning at the application point AP. The coordinates of various points on this seat assembly are given in the chart below. All coordinates are given in inches.

|  | X | Z |
|---|---|---|
| Rear roller initial position (RR) | 0.525 | 3.007 |
| Front roller initial position (FR) | 11.59 | 2.508 |
| Application point (AP) | 12.27 | 1.03 |
| Belt anchor (BA) | −0.9646 | −2.378 |
| Center of ramp surface arc (C) | 30.646 | 20.996 |

The seatpan articulation mechanism of the preferred embodiment operates smoothly with little friction. Seat articulation is preferably achieved by four roller bearing track rollers 26, 27 mounted on the seatpan 22. Each roller runs on tracks 28, 29 in spreaders 30 which are supported by the front and rear lateral structural tubes 32, 34, with short load paths from the rollers to the tubes. This lateral tube and spreader construction allows single, double, triple, quadruple or quintuple seats to be built with a high degree of part commonalty. The seat legs 36, 38 support the lateral tubes, allowing for different seat track spacings and locations.

In an accident or emergency landing, the airplane floor may deform. The articulated seatpan 22 must not jam under yaw or seat track pitch due to deformation of the airplane floor. To assure jam-free operation, all sliding surfaces of the tracks 28 and ramps 29 are preferably covered with a friction-reducing material such as PTFE to minimize friction generated by yaw-induced side loads. Lateral seatpan play is preferably incorporated to allow for spreader sliding surface misalignment. Lateral play on the order of 0.125 inches is preferable for smooth, jam-free operation even in the event of considerable floor deformation. To further assure jam-free operation, sufficient bearing-to-slot clearance is incorporated to allow for bearing skew caused by floor deformation. Preferably, this is in the range of about 0.03 inches clearance. Low friction roller bearing track rollers are preferable so deformation-increased loading does not result in unacceptably high frictional forces.

The seatpan 22 is preferably designed to easily flex in transverse torsion as shown by the arrows C in FIG. 6, allowing the four rollers to go out of plane without developing large contact loads when the ramps and slots are misaligned due to floor deformation. This can be achieved by using an open section (low torsional stiffness) lateral beam 40 at the front of the seatpan 22, and jointed compression links 42, 44 in the rear. The two side plates 46, 47 can then be twisted with respect to each other without jamming the operation of the articulated seatpan.

Another feature which serves to limit pelvic rotation is the use of dynamically stiff foam cushion. The cushion in the seat is preferably made from a polyurethane foam which flows to the occupant's shape over time but stiffens and absorbs energy when rapidly deformed. The weight and pressure of the occupant in the seat forms a pocket conforming to the occupant's shape. During sudden impact, however, the stiffness of the foam resists plowing of the occupant on the cushion and increases the friction between the occupant and the cushion, so the occupant and seatpan tend to move together to a greater degree than is the case with a conventional seat cushion. When a significant downward inertial load is present, the cushion reduces spinal compressive forces by absorbing energy and by stiffening so acceleration of the occupant into the seat structure does not occur, thereby reducing the likelihood of injury due to spinal compression.

The use of such foam also prevents the occupant from sinking into the cushion under a download or from seatbelt forces. Such sinking can allow the lap belt to ride up and off the anterior superior iliac crests of the pelvis, allowing pelvic submarining and abdominal injury. Prevention of downward occupant motion is especially important when a high seatbelt anchor location is used, because the lap belt starts out riding higher on the pelvis, and therefore cannot rise as far. Although the dynamically stiff cushion has the above beneficial effects, it will be understood that an effective reduced head path seat can be designed using conventional foam.

Still another feature of a preferred embodiment which reduces head excursion is a relatively steep initial cushion angle. A steeper initial cushion angle reduces head excursion in two ways. First, it directly adds to the initial rearward pelvic rotation. Second, the longitudinal inertial load more directly pushes the thighs and buttocks into the cushion, increasing the friction between the occupant and the cushion, and more directly opposing the forward motion of the occupant., as can be seen in FIG. 2. While an initial cushion angle of 12.7° with the horizontal can reduce head excursion by 3 to 4 inches, those skilled in the art will weigh the beneficial results of increased initial cushion angle against passenger comfort considerations to achieve the desired result.

A hybrid dynamically stiff/conventional foam cushion may be used to provide the advantages of a steep initial seat cushion angle with greater comfort. A cushion with a dynamically stiff thigh bolster and conventional foam under the buttocks would effectively change shape under a longitudinal inertial load, with the rear of the cushion compressing more than the front, effectively increasing the cushion angle while maintaining passenger comfort under non-emergency conditions.

Although the invention has been described above with respect to certain specific embodiments, the scope of the invention is not limited to the specific embodiments disclosed. Other designs within the spirit and scope of the invention will be apparent to those skilled in the field after receiving the above teachings, and it will be apparent that various combinations of all or some of the above-described features may result in a reduced head path seat within the scope of the invention. The scope of the invention, therefore, is defined by reference to the following claims.

What is claimed is:

1. A seat assembly for limiting forward excursion of the head of a forward-facing occupant in said seat assembly when said seat assembly is subjected to an inertial load of a predetermined magnitude comprising:
   a frame;
   a seat back mounted to said frame;
   a seatpan;
   means for mounting said seatpan to said frame for pivotal motion with respect to said seat back when said seat assembly is subjected to said inertial load; and
   means for mounting a seat belt to said seat assembly at a point above the horizontal plane through the point where the seatpan and seat back meet.

2. The seat assembly of claim 1 wherein said seatpan mounting means includes slots formed in said frame and a plurality of rollers attached to said seatpan, said slots and rollers being configured to direct said seatpan in a forward and upwardly tilting path relative to said seat back.

3. The seat assembly of claim 2 wherein said seat belt comprises a polyester material.

4. The seat assembly of claim 2 further comprising a seat cushion on said seatpan, said cushion being formed of a dynamically stiff foam.

5. The seat assembly of claim 4 wherein said foam is a polyurethane foam.

6. The seat assembly of claim 5 wherein said forward movement of said seatpan is at least three inches.

7. The seat assembly of claim 6 wherein said seat belt forms an angle of substantially 15 degrees with the horizontal.

8. The seat assembly of claim 2 further comprising a ramp assembly on said frame which cooperates with said rollers to impart an upward tilting motion to said seatpan.

9. The seat assembly of claim 8 further comprising a low friction coating on the surfaces of said slots and ramps which contact said rollers.

10. The seat assembly of claim 8 wherein said ramp defines a circular arc.

\* \* \* \* \*

UNITED STATES PATENT AND TRADEMARK OFFICE
CERTIFICATE OF CORRECTION

PATENT NO. : 5,961,073
DATED : October 5, 1999
INVENTOR(S) : T. Wittmann

It is certified that error appears in the above-identified patent and that said Letters Patent is hereby corrected as shown below:

Title page, item [54] and col. 1, line 1, should read --REDUCED HEAD PATH SEAT --

Signed and Sealed this

Fourth Day of April, 2000

Attest:

Q. TODD DICKINSON

*Attesting Officer*  *Director of Patents and Trademarks*